(12) United States Patent
Poulin et al.

(10) Patent No.: US 7,429,999 B2
(45) Date of Patent: Sep. 30, 2008

(54) CAMERA CALIBRATING APPARATUS AND METHOD

(75) Inventors: Pierre Poulin, Québec (CA); Jean-Luc Lessard, Sherbrooke (CA); Denis Lessard, Québec (CA)

(73) Assignee: Centre de Recherche Industrielle du Québec, Québec (CA)

( * ) Notice: Subject to any disclaimer, the term of this patent is extended or adjusted under 35 U.S.C. 154(b) by 413 days.

(21) Appl. No.: 11/133,243

(22) Filed: May 20, 2005

(65) Prior Publication Data

US 2005/0270375 A1    Dec. 8, 2005

Related U.S. Application Data

(60) Provisional application No. 60/573,336, filed on May 24, 2004.

(51) Int. Cl.
    *H04N 17/02* (2006.01)
(52) U.S. Cl. .................................................. 348/187
(58) Field of Classification Search ................. 348/187, 348/188, 175, 208.12; 250/216
    See application file for complete search history.

(56) References Cited

U.S. PATENT DOCUMENTS

| | | | |
|---|---|---|---|
| 5,978,081 A * | 11/1999 | Michael et al. .......... 356/243.1 |
| 6,195,455 B1 | 2/2001 | Mack et al. |
| 6,437,823 B1 | 8/2002 | Zhang |
| 6,621,921 B1 | 9/2003 | Matsugu et al. |
| 7,084,386 B2 * | 8/2006 | Bernardini et al. .......... 250/216 |
| 7,248,284 B2 * | 7/2007 | Pierce ......................... 348/188 |

OTHER PUBLICATIONS

R.K. Lenz, R.Y. Tsai, Technique for calibration of the scale factor and image center for high accuracy 3D machine vision metrology, 1987, IEEE Journal, pp. 68-75.
R. Tsai, A versatile camera calibration technique for high-accuracy 3D machine vision metrology using off-the-shelf TV cameras and lenses, IEEE Journal, Aug. 1987, vol. RA-3, No. 4, pp. 323-344.
R. Tsai, An efficient and accurate camera calibration technique for 3D machine vision, 1986, IEEE Journal, pp. 364-374.

* cited by examiner

*Primary Examiner*—M. Lee
(74) *Attorney, Agent, or Firm*—Jean-Claude Boudreau

(57) ABSTRACT

A camera calibrating apparatus uses a calibration target in combination with a laser source generating a laser beam defining a calibration plane and intersecting the camera field of view to define an object imaging area. The calibration target includes a frame defining a coplanar arrangement of reference points having known position coordinates within an object reference system. The frame is disposed in a camera calibration position wherein the coplanar arrangement of reference points is substantially parallel to the calibration plane. The target includes an arrangement of light reflecting members protruding from the arrangement of reference points in a direction substantially perpendicular thereto, each said member having a light reflecting surface substantially parallel to said direction so as to extend within the object imaging area, to allow the camera to capture an image formed by illuminated portions of the light reflecting members. The apparatus further includes image processor means programmed on the basis a calibrated camera model to associate any position coordinates in the object reference system with corresponding position coordinates in an image reference system.

12 Claims, 5 Drawing Sheets

CAMERA CALIBRATING APPARATUS AND METHOD

This application claims the benefit of U.S. Provisional Application No. 60/573,336 filed May 24, 2004.

FIELD OF THE INVENTION

The present invention relates to the field of object imaging with electronic cameras, and more particularly to camera calibrating targets, as well as apparatus and methods employing such targets for calibrating electronic cameras, in combination with laser light source as part of detection/measurement instrumentation.

BRIEF DESCRIPTION OF THE BACKGROUND ART

Laser and electronic imaging technologies have been used for many years in many product manufacturing applications, particularly for quality control involving numerous types of measurement such as dimension, shape, profile or surface characteristics such as roughness and presence of defects. Typically, measurements are based on the well known laser triangulation ranging principle involving a direct relationship between the distance separating a reference plane and a given point of the surface of an object under inspection as measured along an axis extending in a direction perpendicular to the surface in one hand, and the reflected light being shifted from a corresponding reference position as observed at the imaging sensor or camera location in the other hand. Thus, following an appropriate calibration step, profile data as defined by series of calculated distance values for corresponding points on the surface can be directly derived from light beam shifts measurements. A known calibration approach consists of currently establishing the correspondence between each pixel position coordinates provided at the imaging sensor within an image reference system and the spatial position coordinates of any point located within an inspection area delimited by the optical field of view of the imaging sensor or camera and the illumination plane defined by the laser beam and with respect to a world or object reference system, using a mathematical camera model such as proposed by Roger Tsai in "A versatile camera calibration technique for High-Accuracy 3D machine vision metrology using off-the-shelf TV cameras and lenses", IEEE Journal of Robotics and Automation, Vol. RA-3, No. 4, August 1987, which model is calibrated from position coordinates data obtained through initial measurements using a calibration target of either of the coplanar or non-coplanar type. A non-coplanar calibration target consists of a structure defining a three-dimensional arrangement of reference points having known position coordinates within a three-dimensional reference system associated with such structure. In use, the structure is accurately disposed in a camera calibration position with respect to the three coordinates axis of the reference system and with respect to the illumination plane defined by the laser source beam. The use of non-coplanar calibration targets may be required in certain cases where an unknown optical parameter such as scale factor uncertainty, has to be estimated. However, they require simultaneous and precise alignment with respect to all three coordinates axis of the reference system, whereas coplanar calibration targets require precise alignment with respect to only two coordinates axis of the same reference system. Known coplanar and non-coplanar camera calibration targets are disclosed in U.S. Pat. No. 6,621,921 B1, U.S. Pat. No. 6,437,823 B1 and U.S. Pat. No. 6,195,455 B1. Although coplanar camera calibration targets are less arduous to align with the illuminating plane defined by the laser source as compared with non-coplanar calibration targets, the alignment still remains a critical operation in order to achieve the measurement accuracy requirements. Therefore, there is still a need for improved coplanar calibration targets as well as apparatus and method using such improved targets exhibiting ease of operation while insuring high position coordinates measurement accuracy.

SUMMARY OF INVENTION

It is therefore a main object of the present invention to provide a camera calibrating target, a camera calibrating apparatus and method using such target, which accurate correspondence between actual position coordinates within calibration plane defined by a laser beam and the image position coordinates generated by the camera according to its specific optical characteristics while involving minimal target alignment accuracy requirements.

According to the above main object, from a broad aspect of the present invention, there is provided a camera calibrating target for use with a laser source capable of generating a beam of coherent light defining a calibration plane, the camera being characterized by a field of view in the direction of an optical axis forming a predetermined angle with said calibration plane, the beam intersecting the field of view of the camera to define an object imaging area. The camera calibrating target comprises a frame defining a coplanar arrangement of reference points having known position coordinates within an object reference system associated with the frame and defining at least two dimensions, the frame being capable of being disposed in a camera calibration position wherein the coplanar arrangement of reference points is substantially parallel to the calibration plane. The target further comprises an arrangement of light reflecting members protruding from the arrangement of reference points in a direction substantially perpendicular thereto each said member having a light reflecting surface substantially parallel to said direction so as to extend within the object imaging area when the frame is disposed in the camera calibration position to allow the camera to capture an image formed by illuminated portions of the light reflecting members.

So as to maximize quality of the captured calibration image, the reference points are located with one another within the arrangement and with respect to the coherent light beam so as to prevent shading of reflecting members which may adversely affect the illuminated portions in forming the image.

Conveniently, the two-dimensional arrangement includes a plurality of reference points series extending substantially transversely to the coherent light beam and being disposed in parallel spaced apart relationship in the direction of the light beam from a foremost position on the frame proximal to the laser source to a rearmost position on the frame distal to the laser source.

Preferably, the respective points of adjacent ones of said series are transversely shifted with one another within the arrangement and with respect to the coherent light beam so as to prevent shading of reflecting members which may adversely affect the illuminated portions in forming the image.

According to the above main object, from a further broad aspect of the invention, there is provided a camera calibrating apparatus for use with a laser source capable of generating a beam of coherent light defining a calibration plane, the camera being characterized by intrinsic imaging parameters and a field of view in the direction of an optical axis forming a predetermined angle with the calibration plane, the beam intersecting the field of view of the camera to define an object imaging area. The apparatus comprises a calibration target including a frame defining a coplanar arrangement of reference points having known position coordinates within an object reference system associated with the frame and defining at least two dimensions; the frame being capable of being disposed in a camera calibration position wherein the coplanar arrangement of reference points is substantially parallel to the calibration plane. The target further includes an arrangement of light reflecting members protruding from the arrangement of reference points in a direction substantially perpendicular thereto, each said member having a light reflecting surface substantially parallel to said direction so as to extend within the object imaging area when the frame is disposed in the camera calibration position to allow the camera to capture an image formed by illuminated portions of the light reflecting members. The apparatus further comprises image processor means for estimating position coordinates of the illuminated portions within an image reference system associated with the camera, for associating the estimated position coordinates of each illuminated portion within the image reference system with the known position coordinates of a corresponding one of said reference points in relation with a corresponding one of said calibration planes within the object reference system, for calibrating a camera model based on the intrinsic imaging parameters with the associated known position coordinates and estimated position coordinates, and for using the calibrated camera model to associate any position coordinates in the object reference system with corresponding position coordinates in the image reference system.

According to the above main object, from another broad aspect of the present invention, there is provided a method of calibrating a camera characterized by intrinsic imaging parameters and a field of view in the direction of an optical axis. The method comprises the steps of: i) generating a beam of coherent light defining a calibration plane; ii) disposing the camera so that its field of view in the direction of its optical axis forms a predetermined angle with the calibration plane and so that the beam intersects the field of view of the camera to define an object imaging area; iii) providing a calibration target including: a) a frame defining a coplanar arrangement of reference points having known position coordinates within an object reference system associated with the frame and defining at least two dimensions; and b) an arrangement of light reflecting members protruding from the arrangement of reference points in a direction substantially perpendicular thereto, each said member having a light reflecting surface substantially parallel to said direction ; iv) disposing the frame in a camera calibration position wherein the coplanar arrangement of reference points is substantially parallel to the calibration plane so that the light reflecting members extend within the object imaging area; v) generating with the camera an image formed by illuminated portions of the light reflecting members; vi) estimating position coordinates of the illuminated portions within an image reference system associated with the camera; vii) associating the estimated position coordinates of each illuminated portion within the image reference system with the known position coordinates of a corresponding one of the reference points within the object reference system; viii) calibrating a camera model based on the intrinsic imaging parameters with the associated known position coordinates and estimated position coordinates; and ix) using the calibrated camera model to associate any position coordinates in the object reference system with corresponding position coordinates in the image reference system.

DETAILED DESCRIPTION OF THE PREFERRED EMBODIMENTS

Figure 1:
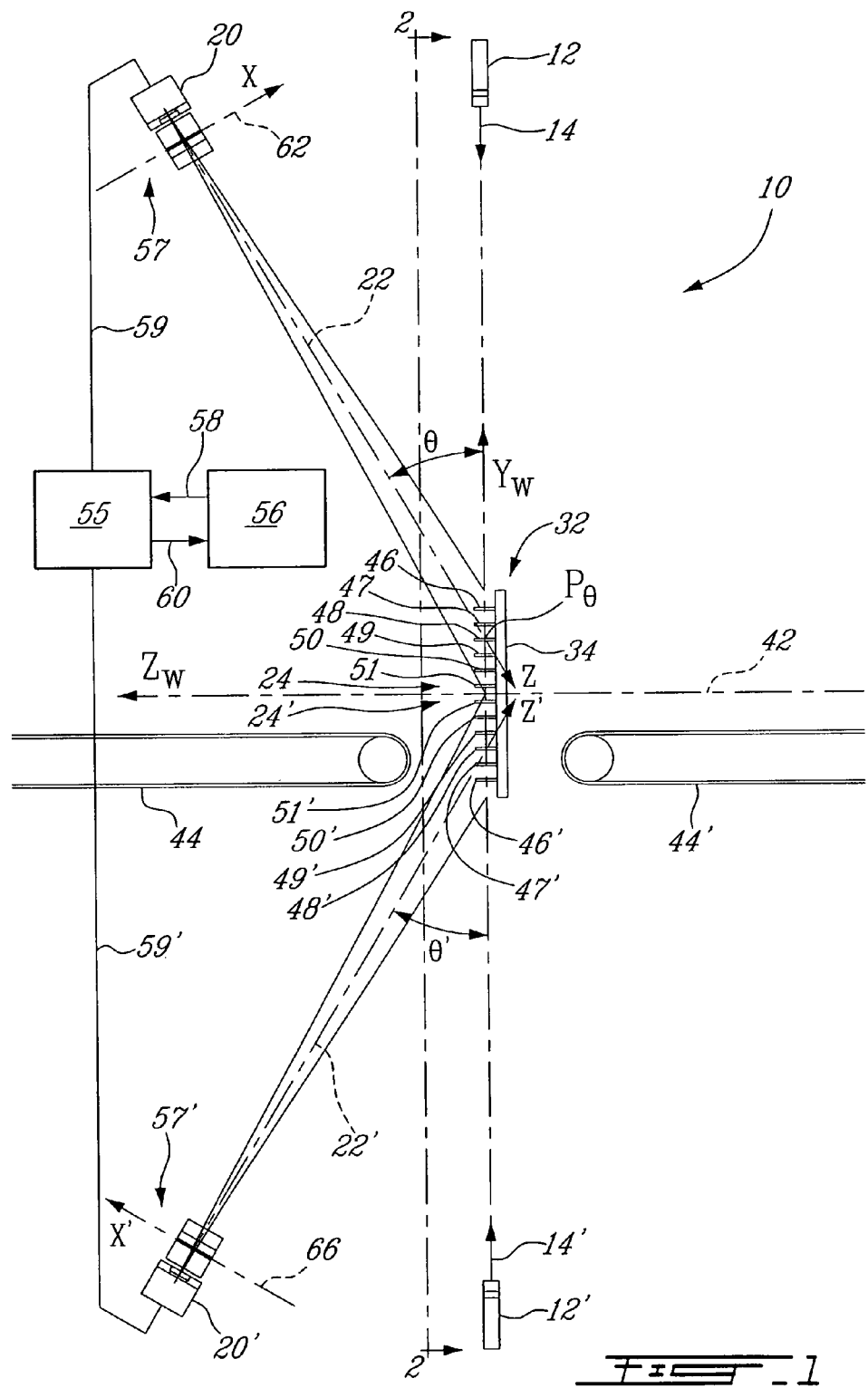
FIG. 1 is an elevation view of the camera calibration apparatus according to a first embodiment of the present invention, showing the calibration target aligned with the respective light beams generated by two laser sources associated with respective electronic cameras subjected to a calibration procedure.

Preferred embodiments of camera calibration apparatus and method making use of a calibration target according to the invention will now be described in detail. Referring now to FIG. 1, a basic camera calibration apparatus set up using the calibration target of the invention and generally designated at 10, includes a laser source 12, such as a Lasiris™ SNF laser supplied by Stocker Yale (Salem, N.H.) for generating a beam of coherent light represented at 14 being preferably of a fan-shaped type as better shown in FIG. 2 so as to define a calibration plane generally designated at 16 and delimited by axis lines 18, 18' and 28 shown in FIG. 2 as determined by a preset scanning range characterizing laser source 12. As shown in FIG. 1, a camera 20 such as model A501K supplied by Basler Vision Technologies (Exton, Pa.), which is subjected to the calibration procedure, is disposed with respect to the calibration plane 16 defined by laser source 12 so that its field of view in the direction of optical axis 22 forms a predetermined angle $\theta$ with the calibration plane defined by laser beam 14, which angle $\theta$ is formed at an intersection points $P_\theta$ of the calibration plane as better shown in FIG. 2. Angle $\theta$ should be preferably of at least 30° for providing depth to reference points defined by the calibration target, as will be explained later in more detail. It can be seen from FIGS. 1 and 2 that the laser beam 14 intersects the field of view of camera 20 so as to define and object imaging area generally designated at 24 forming a projection within an object reference system generally designated at 26 defining at least two dimensions, namely represented by $X_w$ axis 28 and $Y_w$ axis 30, delimited by X axis 28 between coordinates $X=X_1$ and $X=X_2$ and by Y axis 30 between coordinates Y=0 and Y=Y₁. According to a preferred embodiment, the camera calibrating target 32 includes a frame 34, defining a coplanar arrangement of reference points 37, 38, 39, 40, 41 as better shown in FIG. 2, which reference points have known position coordinates within the object reference system 26 associated with frame 34. It can be seen from FIG. 1 in view of FIG. 2 that the frame 34 is capable of being disposed in a camera calibration position wherein the coplanar arrangement of reference points 37, 38, 39, 40, 41 is substantially parallel to the calibration plane 16. The calibration target frame 34 may be adjustably maintained in the camera calibration position using any appropriate support means (not shown). In the example shown in FIGS. 1 and 2, camera and laser source 12 are angularly oriented with one another so that the object imaging area 24 corresponding to camera calibration position of target frame 34 substantially coincides with an object scanning location intersected by an object travelling path represented by axis 42 as defined by conveyors 44, 44' of a transport system adapted to be used in combination with laser source 12 and camera 20 following the calibration procedure. It can be seen from FIG. 1 that the calibration target 32 further includes an arrangement of light reflecting members 46, 47, 48, 49, 50, 51 protruding from the arrangement of reference points 36, 37, 38, 39, 40, 41, in a direction substantially perpendicular thereto so as to extend within the object imaging area 24 when the frame 34 is disposed in the camera calibration position allowing camera 20 to capture an image formed by illuminated portions of the light reflecting members 46, 47, 48, 49, 50, 51. Although the frame 34 is of a rectangular shape in the example shown, it is to be understood that any other appropriate shape may be used, provided that a sufficient number of adequately distributed reflecting members extend within the object imaging area.

Figure 3:
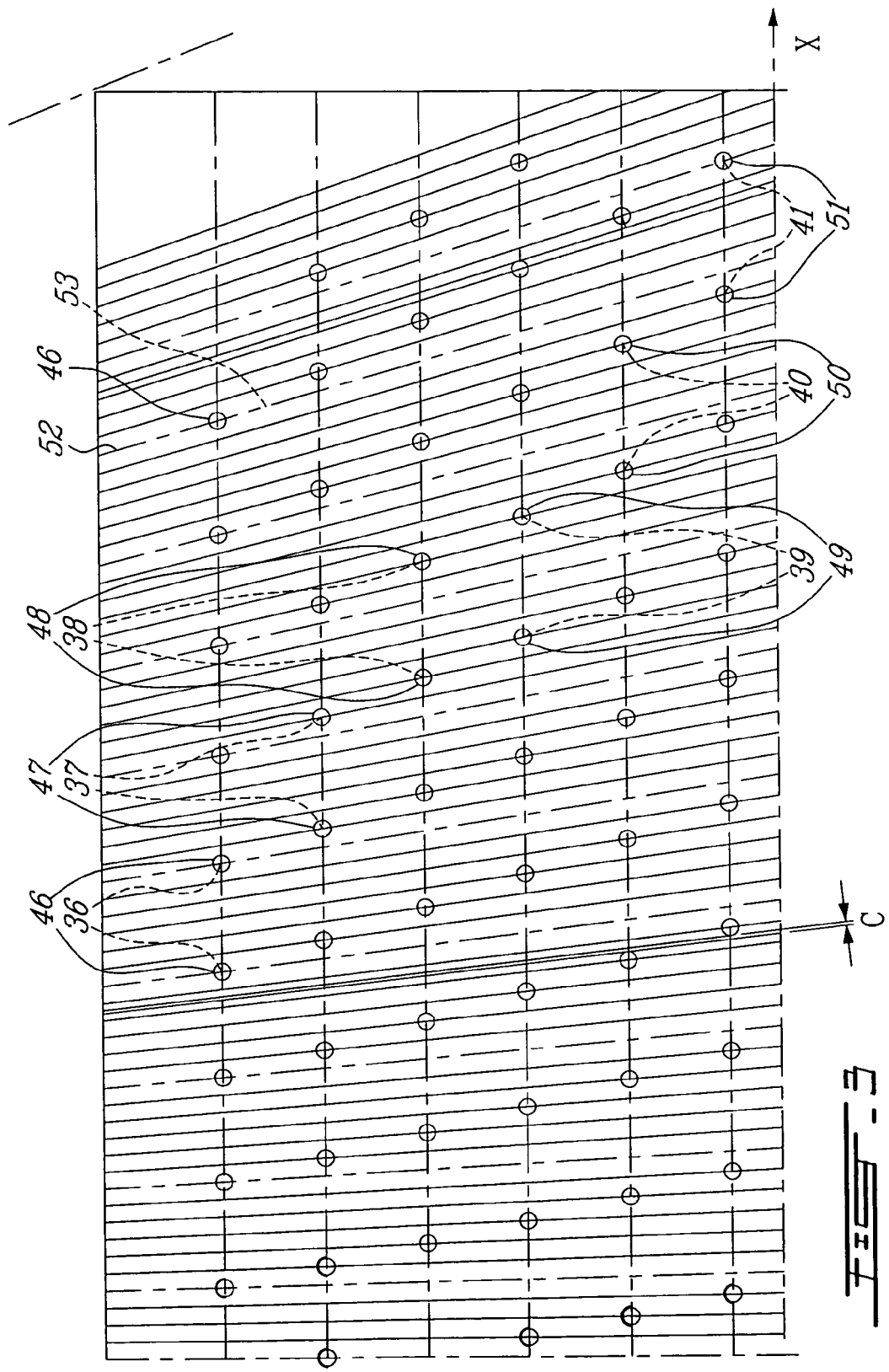
FIG. 3 is an enlarged partial view of the camera calibration target illustrated in FIG. 2, on which the trajectories of light rays are shown to illustrate that the particular arrangement of reference points and associated reflecting members ensure efficient illumination thereof by laser beam to prevent shading effect.

Turning now to FIG. 3, reference points 36, 37, 38, 39, 40, 41 are located with one another within the arrangement and with respect to light beam 14 so as to prevent shading of reflecting members 47, 48, 49, 50, 51 as shown in FIG. 1 which may adversely affect the illuminated portions thereof in forming the image by camera 20. The external diameter of the light reflecting members 46, 47, 48, 49, 50, 51 as well as their location on frame 34 as defined by corresponding reference points 36, 37, 38, 39, 40, 41 are determined considering the camera resolution, width and height dimensions of the imaging area along $X_w$ axis 28 and $Y_w$ axis 30, as well as the relative position of the laser source 12, so as to ensure that all light reflecting members, which are optimally distributed within the imaging area, receive appropriate illumination. More particularly, the coplanar arrangement is designed to include a plurality of reference point series respectively corresponding to points 36, 37, 35, 39, 40, 41 which extend substantially transversely to coherent light beam 14 as represented by a set of rays in FIG. 3 originating from laser source 12, and being disposed in parallel spaced apart relationship in the direction of light beam 14 from a foremost position on the frame 34 proximal to laser source 12, corresponding to series of reference points 36, to a rearmost position on frame 34 distal to laser source 12, corresponding to series of reference points 41 in the example shown. It can be seen from FIG. 3 that the shadow area extending along any ray axis 52 aligned with any corresponding ray 53 as a result of the illumination of any corresponding reflecting member such at 46 in the example shown, is offset to any other ray axis associated with any other incident light ray that illuminates it. It can also be seen from FIG. 3 that the minimum transverse clearance along X axis 28 is set to a value "C" that is sufficient to prevent adverse shading while complying with camera image resolution to ensure reliable position coordinates determination of each point from the captured image. In other words, the respective points of adjacent ones of series 36, 37, 38, 39, 40 and 41 are transversely shifted with one another within the arrangement and with respect to light beam 14 so as to prevent shading of deflecting members 47, 48, 49, 50 and 51 which may adversely affect the illuminated portion thereof in forming the image captured by camera 20. It can be appreciated that the spacing between adjacent reflecting members 46 of the foremost series must be set at a higher value as the imaging area height is increased. Preferably, an appropriate coating is applied onto the surface subjected to illumination on each light-reflecting member, to provide a resulting reflectance that is comparable with the reflectance obtained with the real object to be inspected. Since the calibration procedure requires position identification of each light-reflecting member on a captured image, each reflecting member must receive a minimal illumination level from the laser beam. A minimum identification threshold corresponding to a minimum image grey level, allowing segmentation of the image portion corresponding to reflecting member as opposed to image background, may be estimated. With the particular camera used in the present example, such identification Threshold has been set to at least 10/255 to prevent segmentation error. The calibration procedure requires establishing a correspondence between the actual world object coordinates within the object reference system 26 with image coordinates within the image reference system derived from the calibration target image. For so doing, two sorting steps are preferably performed successively on the basis of estimated image coordinates. Assuming that the actual world, object coordinates are generated line by line, from top to bottom and from left to right, knowing the exact number of points on each line, the image coordinates are first sorted from top to bottom and then from left to right within each line. Hence, exact correspondence between image coordinates and object coordinates can be obtained, provided the calibration target is adequately positioned. The calibration target 32 must be positioned in such a manner That none of the reference points within any series, for instance series 36, located along $Y_w$ axis 30 over any point of a following reference points series, such as series 37 for the instant example. It is to be understood that any other appropriate manner to establish a correspondence between the object coordinates and the image coordinates, such as using a predetermined matching data file stored in the computer, can be employed.

Figure 2:
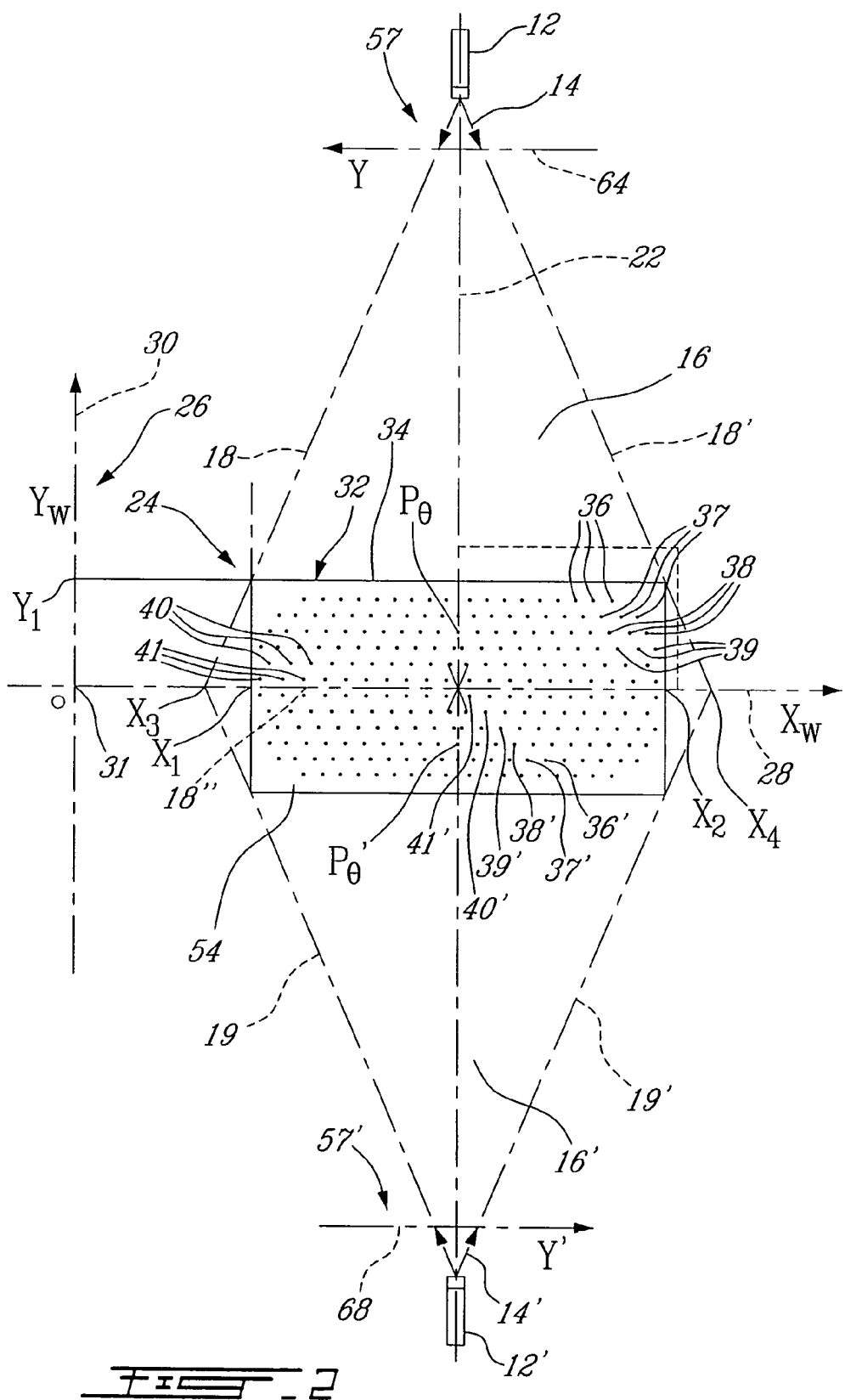
FIG. 2 is a front end view, along lines 2-2 shown in FIG. 1, of the camera calibration target and laser source of the calibration set up of the first embodiment, showing the particular spatial arrangement of reference points from which protrude the light reflecting members as part of the calibration target.

Conveniently, in cases where more than one surface or side of an object has to be scanned simultaneously, a same camera calibration target 32 can be provided with complementary sets of reference points series designated at 36', 37', 38', 39', 40', 41' in FIG. 2 and corresponding light reflecting members 46', 47', 48', 49', 50', 51' as shown in FIG. 1 which are disposed symmetrically with respect to X axis 28 in the example shown, as part of a complementary section 54 provided on the calibration target 32 It is to be understood that a different, non-symmetrical configuration may also be used depending on the specific application contemplated. For example, camera 20' may be chosen to have different imaging resolution as compared to camera 20, and the spatial distribution and diameter of the reflecting members provided on target complementary section 32 may be set accordingly. Furthermore, in a case where articles to be inspected while carried by conveyers 44, 44' shown in FIG. 1 exhibit thickness variations so that the position of their respective top surfaces varies with reference to axis $Y_w$ 30, the field of view characterizing camera 20 must be different to the field of view of camera 20' which scans article bottom surfaces whose position with reference to axis $Y_w$ 30 is substantially maintained at the level of conveyers 44,44'. The complementary section 54 of calibration target 32 can be used with a further laser source 12' for generating a second laser beam 14', associated with a further camera 20' characterized with a complementary field of view in the direction of its optical axis 22' forming a predetermined angle θ' with a complementary calibration plane 16' delimited by axis lines 19, 19' and associated with further camera 12'. The calibration plane 16' is aligned with calibration plane 16 when a single calibration frame for two cameras is used. Although axis lines 18, 19 and 18', 19' intersect axis $X_w$ 28 respectively at same points $x_3$, $x_4$ since laser sources 12, 12' use equal fan angles in the example shown in FIG. 2, it is to be understood that different fan angles may be set for laser sources 12, 12', provided that the desired target areas are illuminated. As part of a camera calibrating apparatus using the calibration target of the present invention, there is provided a processor means including an image signal acquisition module 55 for receiving image signals from either camera 20 or 20' through lines 59, 59' using commercially available hardware such as model Odyssey X-Pro™ supplied by Matrox Electronic System (Dorval, Quebec, Canada) and a computer 56 having the capability to run the required image analysis software that is especially programmed to carry out image processing steps, as will be explained in detail below with reference to FIGS. 4 and 7, using a well-known camera calibrating algorithm based on a camera model proposed by Roger Y. Tsai in "A Versatile Camera Calibration Technique for High-Accuracy 3D Machine Vision Metrology Using Off-the-Shelf TV Cameras and Lenses, IEEE Journal of Robotics and Automation, Vol. RA-3, NO. 4, August 1987, pages 323-344.

A first preferred mode of operation of the camera calibrating target as described above according to a preferred embodiment of the invention will now be explained in more detail. The same calibration procedure can be performed in a same manner for each camera 20, 20'. Referring to FIG. 1, the computer 56 sends a control signal to the acquisition module 55 through data line 58 for causing thereof to transfer through input data line 60 the data representing camera image formed by illuminated portions of light reflecting members 46, 47, 48, 49, 50, 51 or 46', 47', 48', 49', 50', 51' as received from either camera 20 or 20' depending on the computer command sent.

Figure 4:
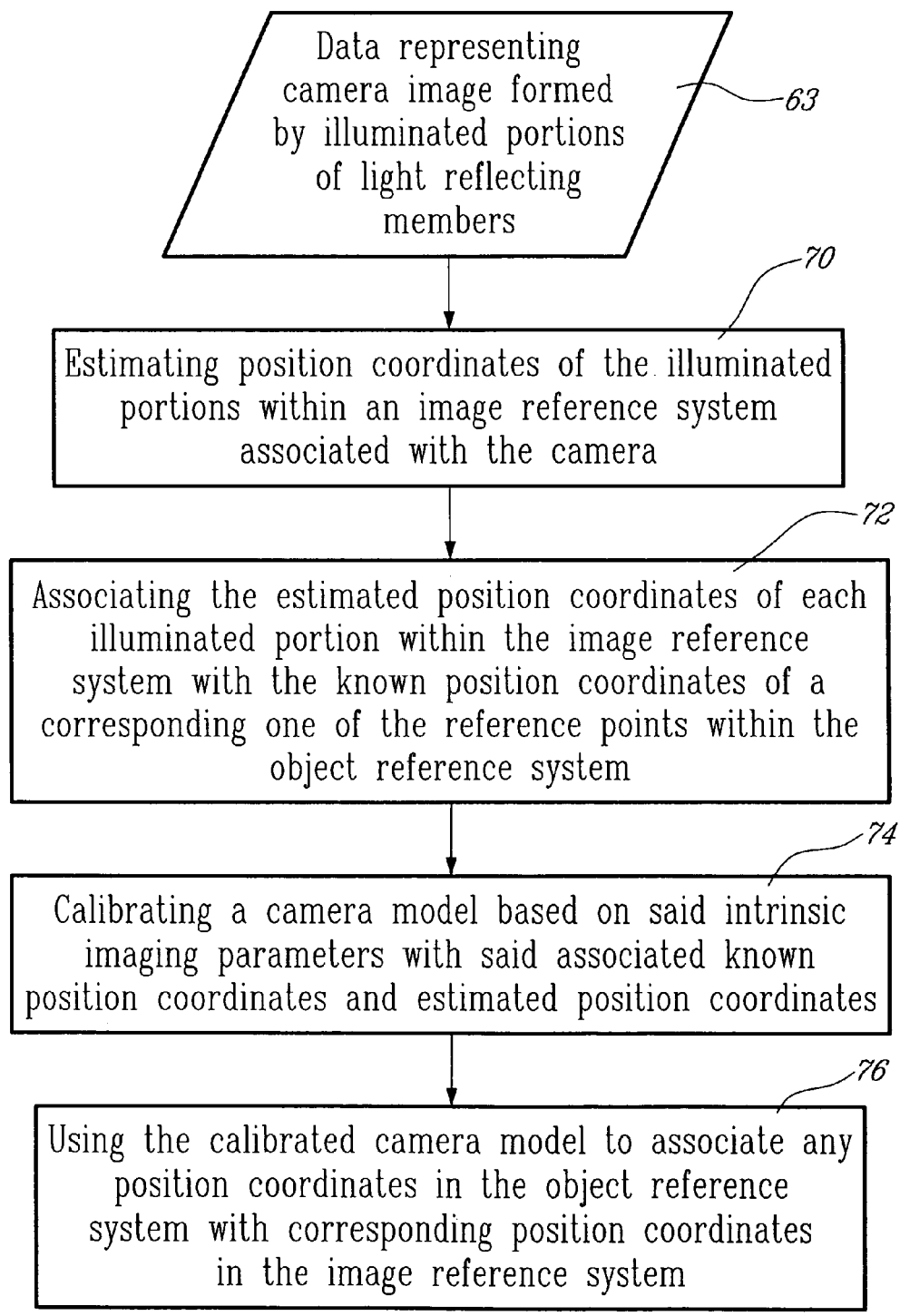
FIG. 4 is a process flow diagram showing the main image processing steps performed according to a coplanar calibration procedure using the calibration target of the invention, to associate any position coordinates in the object reference system with corresponding position coordinates in the image reference system.

Referring now to FIG. 4, the image data represented at 63 in the process flow diagram can be obtained as follows. In order to prevent image contamination due to background pixels in the identification of image points corresponding to reference points provided on the calibration target, a preliminary image processing algorithm is preferably performed on the raw image captured by the camera 20. Such algorithm typically requires that all reference points of the calibration target are made visible in the image, and when background contamination areas exist in the image, such areas are individually smaller than the illuminated portion of each reflecting member, or their respective grey levels are lower than a preset detection threshold. According to this algorithm, a current threshold is first initialized to the value of the preset minimum threshold. Then the raw image is binarized using the current threshold, followed by a detection of all image blobs which respective area is higher than the minimum area corresponding to the level of reflection of the laser beam onto a given reflecting member. If the detected number of blobs corresponds with the number of reflection members provided on the target, the resulting image containing only the calculated blobs is generated so as to eliminate any background contamination. Otherwise, the current threshold is incremented and the algorithm is repeated until the above condition is satisfied. Then, the mass centre of each image blob is calculated using a well-known image processing subroutine, assuming that the calculated mass centre substantially corresponds to the actual mass centre position. It is to be understood that many alternate image pre-processing algorithms may be used to generate reliable image data 63. Hence, image data 63 is used by computer 56 at step 70 to estimate position coordinates of the illuminated portions within an image reference system generally designated at 57, 57' in FIGS. 1 and 2 associated with the selected camera 20, 20', respectively formed by X axis 62 in FIG. 1 and Y axis 64 in FIG. 2 for camera 20, and X' axis 66 in FIG. 1 and Y' axis 68 in FIG. 2 for camera 20' wherein axis Z' is colinear with optical axis 22'. Since the reference points 36, 37, 38, 39, 40, 41 provided on the upper portion of calibration target 32 shown in FIG. 2 are coplanar, the ($X_w$, $Y_w$, $Z_w$) object reference system at 26 may be chosen so that $Z_w$=, while the origin at 31 is distant from optical Z axis 22 at point $P_\theta$ as well as from Y axis 64 of the image system 57, to ensure that $T_Y$ component of the translation vector be different from zero, in order to simplify the computation procedure that will be explained later in detail. At step 70, the position coordinates ($X_d$, $Y_d$) of the illuminated portion within image reference system 57 are computed using predetermined intrinsic imaging parameters characterizing the camera 20. A whole image frame stored in memory of computer 56 is fetched to detect row and column number of each reference point i as expressed by ($X_{fi}$, $Y_{fi}$) for i=1, ..., N, wherein N is the total number of reference points. Then the position coordinates ($X_d$, $Y_d$) representing the distorted or true image coordinates are derived using the following equations:

$$X_{di} = s_x^{-1} d'_x (X_{fi} - C_x) \quad (1)$$

$$Y_{di} = d_y (Y_{fi} - C_y) \quad (2)$$

$$d'_x = d_x \frac{N_{cx}}{N_{fx}} \quad (3)$$

wherein ($C_x$, $C_y$) are row and column numbers of the centre of computer image frame memory;

$d_x$ is the centre-to-centre distance between adjacent sensor elements in X scanning direction;

$d_y$ is centre-to-centre distance between adjacent CCD sensors provided on the camera in the Y direction;

$N_{cx}$ is the number of sensor elements in the X direction;

$N_{fx}$ is the number of pixels in a line as sampled by the computer; and $s_x$ is an image scale factor used to compensate uncertainty about estimation of $d_x$ and $d_y$.

When unknown, the scale factor $s_x$ can be estimated using a simple technique as proposed by R. K. et al. in "R. K. Lenz and R. Y. Tsai, "Techniques for calibration of the scale factor and image centre for high accuracy 3D machine vision metrology", Proc. IEEE Int. Conf. Robotics and Automation, Raleigh, N.C., Mar. 31-Apr. 3, 1987. Then, at a following step 72 shown in FIG. 4, the estimated position coordinates ($X_{di}$, $Y_{di}$) of each illuminated portion within image reference system 57 is associated with the known position coordinates ($X_{wi}$, $Y_{wi}$, $Z_{wi}$) of a corresponding one of the reference points 36, 37, 38, 39, 40, 41 within the object reference system 26. At a following step 74, a camera model based on intrinsic imaging parameters characterizing camera 20 is calibrated with known position coordinates ($X_{wi}$, $Y_{wi}$, $Z_{wi}$) and estimated position coordinates ($X_{di}$, $Y_{di}$) that have been associated at prior step 72. For each pair of position coordinates ($X_{wi}$, $Y_{wi}$, $Z_{wi}$), ($X_{di}$, $Y_{di}$), and using a number of reference points N being much larger than 5, the following linear equation is used to derive the values of external parameter related components $T_y^{-1}r_1$, $T_y^{-1}r_2$, $T_y^{-1}T_x$, $T_y^{-1}r_4$, $T_y^{-1}r_5$:

$$[Y_{di}x_{wi} \; Y_{di}y_{wi} \; Y_{di} \; -X_{di}x_{wi} \; -X_{di}y_{wi}] \begin{bmatrix} T_y^{-1}r_1 \\ T_y^{-1}r_2 \\ T_y^{-1}r_3 \\ T_y^{-1}r_4 \\ T_y^{-1}r_5 \end{bmatrix} = X_{di} \quad (4)$$

$$\begin{bmatrix} x \\ y \\ z \end{bmatrix} = R \begin{bmatrix} x_w \\ y_w \\ z_w \end{bmatrix} + T \quad (5)$$

$$R \equiv \begin{bmatrix} r_1 & r_2 & r_3 \\ r_4 & r_5 & r_6 \\ r_7 & r_8 & r_9 \end{bmatrix} \quad (6)$$

$$T \equiv \begin{bmatrix} T_X \\ T_X \\ T_Z \end{bmatrix} \quad (7)$$

$$X_u = f \frac{x}{z} \quad (8)$$

$$Y_u = f \frac{y}{z} \quad (9)$$

$$X_d + D_x = X_u \quad (10)$$

$$Y_d + D_y = Y_u \quad (11)$$

$$D_x = X_d \kappa_1 r^2 \quad (12)$$

$$D_y = Y_d \kappa_1 r^2 \quad (13)$$

$$r = \sqrt{X_d^2 + Y_d^2} \quad (14)$$

wherein:

(x,y,z) represent the coordinates of any point within a three-dimensional reference system (not shown) associated with the camera;

R is the 3×3 rotation matrix as an external parameter;

$r_1, \ldots r_9$ are the rotation coefficient of the rotation matrix R;

T is the translation vector as an external parameter;

$T_x, T_y, T_z$ are the three components of the translator vector T;

($X_u, Y_u$), are ideal, undistorted image coordinates using perspective projection within the camera three-dimensional reference system according to known pinhole camera geometry, which corresponds to the image reference system 57;

$f$ is the focal length as an intrinsic parameter characterizing the camera, which is the distance between the image plane defined by axis X and Y of the image reference system 57 and the optical centre corresponding to the origin of the camera three-dimensional coordinates system;

$D_x, D_y$ represent radial distortion respectively along axis X and Y of image reference system 57, as estimated by the first term of a corresponding infinite series;

($X_d, Y_d$) are actual, distorted position coordinates in the image reference system 57; and $\kappa_1$ is the radial distortion coefficient.

Having solved equation (4) to obtain values of $T_y^{-1}r_1$, $T_y^{-1}r_2$, $T_y^{-1}T_x$, $T_y^{-1}r_4$, $T_y^{-1}r_5$, the values of rotation coefficient $r_1 \ldots$ $r_9$ as well as the translation components $T_x, T_y$ can be computed using the following 2×2 submatrix:

$$C \equiv \begin{bmatrix} r_1' & r_2' \\ r_4' & r_5' \end{bmatrix} \equiv \begin{bmatrix} r_1/T_y & r_2/T_y \\ r_4/T_y & r_5/T_y \end{bmatrix} \quad (15)$$

if none of whole rows or columns of C vanishes, the component $T_y$ can be computed from:

$$T_y^2 = \frac{S_r - [S_r^2 - 4(r_1'r_5' - r_4'r_2')^2]^{1/2}}{2(r_1'r_5' - r_4'r_2')^2} \quad (16)$$

wherein $S_r = r_1'^2 + r_2'^2 + r_4'^2 + r_5'^2$;

if a given row or column of C vanishes, the component $T_y$ can be obtained from:

$$T_y^2 = (r_i'^2 + r_j'^2)^{-1} \quad (17)$$

wherein $r_i'$, $r_j'$ are the elements in the row or column of C that do not vanish. Having extracted the square root of component $T_y$ from either equation (16) or (17), the sign of $T_y$ can be determined by first choosing an object reference point i associated with computer image coordinates ($X_{fi}, Y_{fi}$) away from image centre ($C_X, C_Y$) corresponding to object coordinates ($X_{wi}, Y_{wi}, Z_{wi}$). Then by assuming that the sign of $T_y$ is "+1", the following expression are computed:

$$r_1 = (T_y^{-1}r_1)T_y \quad (18)$$

$$r_2 = (T_y^{-1}r_2)T_y \quad (19)$$

$$r_4 = (T_y^{-1}r_4)T_y \quad (20)$$

$$r_5 = (T_y^{-1}r_5)T_y \quad (21)$$

$$T_x = (T_y^{-1}T_x)T_y \quad (22)$$

$$x = r_1 x_w + r_2 y_w + T_x \quad (23)$$

$$y = r_4 x_w + r_5 y_w + T_y \quad (24)$$

assuming that $T_y^{-1}r_1$, $T_y^{-1}r_2$, $T_y^{-1}T_x$, $T_y^{-1}r_4$ and $T_y^{-1}r_5$ have been previously determined in a manner explained above. Hence, if the values for x and X have a same sign as well as the sign of y and Y values, then the sign of $T_y$ is "+1", otherwise the sign of $T_y$ is "−1". As to the rotation coefficient $r_1, \ldots r_9$ and $T_x$, they can be derived as follows:

$$r_1 = (T_y^{-1}r_1)T_y \quad (25)$$

$$r_2 = (T_y^{-1}r_2)T_y \quad (26)$$

$$r_4 = (T_y^{-1}r_4)T_y \quad (27)$$

$$r_5 = (T_y^{-1}r_5)T_y \quad (28)$$

$$T_x = (T_y^{-1}T_x)T_y \quad (29)$$

Then, an approximation of focal length $f$ is computed from the following linear equations:

$$[y_i \; -d_y Y_i] \begin{bmatrix} f \\ T_z \end{bmatrix} = w_i d_y Y_i \quad (30)$$

$$y_i = r_4 x_{wi} + r_5 y_{wi} + r_6 \cdot 0 + T_y \quad (31)$$

$$w_i = r_7 x_{wi} + r_8 y_{wi} + r_9 \cdot 0 \quad (32)$$

if the obtained value for $f$ is positive, the rotation matrix R can be calculated using the following expression:

$$R = \begin{bmatrix} r_1 & r_2 & (1-r_1^2-r_2^2)^{1/2} \\ r_4 & r_5 & (1-r_4^2-r_5^2)^{1/2} \\ r_7 & r_8 & r_9 \end{bmatrix} \quad (33)$$

wherein s is the inverted sign of the resulting sign of ($r_1 r_4 + r_2 r_5$), with $r_7$, $r_8$, $r_9$ being determined from the outer product of the first two rows using the orthonormal and right-handed property of rotation matrix R. If the approximate value of $f$ obtained with equation (30), (31) and (32) is negative, the rotation matrix R can be calculated from the following expression:

$$R = \begin{bmatrix} r_1 & r_2 & -(1-r_1^2-r_2^2)^{1/2} \\ r_4 & r_5 & -s(1-r_4^2-r_5^2)^{1/2} \\ -r_7 & -r_8 & r_9 \end{bmatrix} \quad (34)$$

Then, equations (30), (31) and (32) may be used to derive an approximate value for translation components $T_z$ which will be used along with approximate values obtained for $f$ and $\kappa_1$ an exact solution for these parameters using the following equations:

$$d'_y Y + d_y Y K_1 r^2 = f \frac{r_4 x_w + r_5 y_w + r_6 z_w + T_y}{r_7 x_w + r_8 y_w + r_9 z_w + T_z} \quad (35)$$

with:

$$r = \sqrt{(s_x^{-1} d'_x X)^2 + (d_y Y)^2} \quad (36)$$

The above equations are solved using a standard optimization scheme such as well known steepest descent, wherein approximate values for $f$ and $T_z$ are used as initial values with $\kappa_1 = 0$. All intrinsic parameters in the camera model as generally defined in equation (5) having been determined, the calibrated camera model so obtained can be used, in final step 76 shown in FIG. 4 to associate any position coordinates ($X_w$, $Y_w$, $Z_w$) in the object reference system 26 with corresponding position coordinates ($X_d$, $Y_d$) in the image reference system 57.

Figure 5:
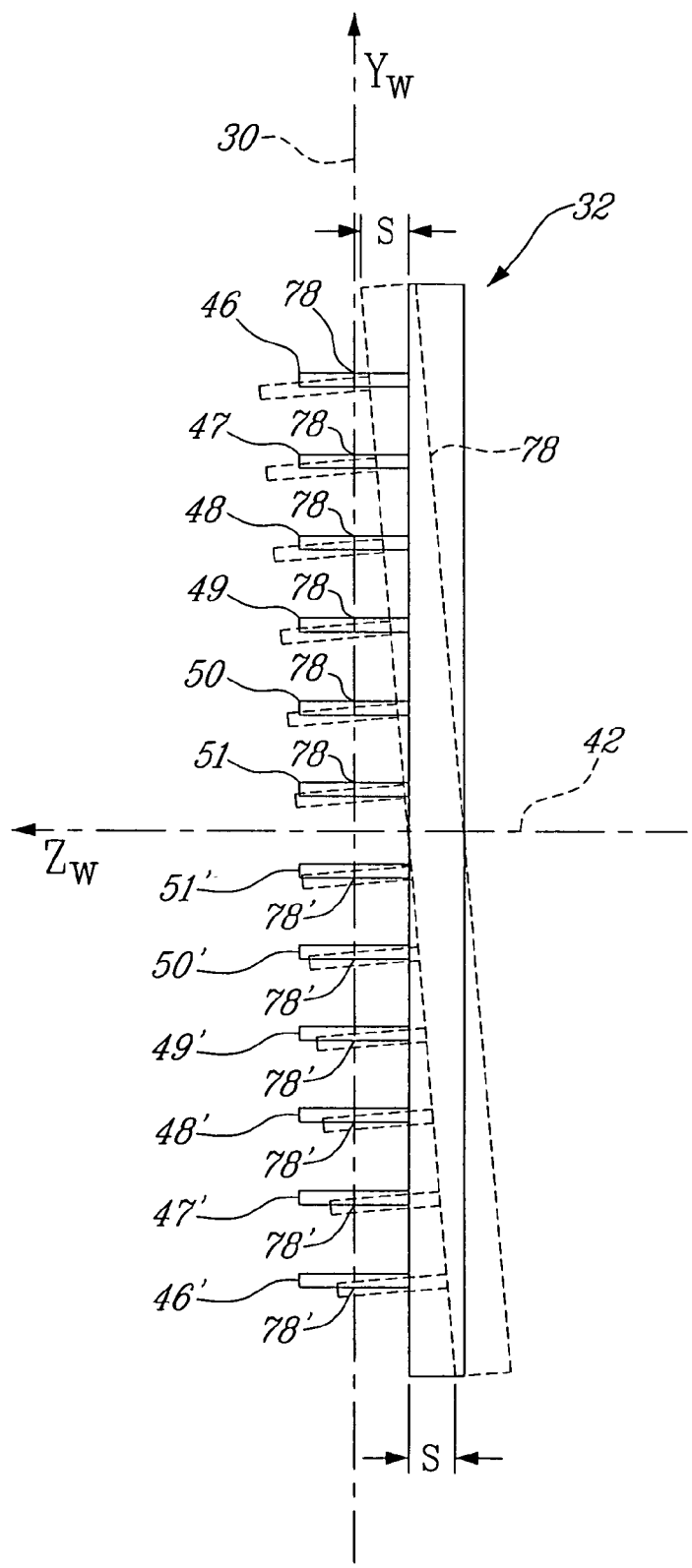
FIG. 5 is a detailed elevation view of the camera calibration target as part of the embodiment shown in FIG. 1 and shown in two different positions, to illustrate that the captured image is not significantly affected by a deviation in alignment of the calibration target with respect to the calibration plane.

Turning now to FIG. 5, it can be seen that a misalignment of the calibration target 32, in rotation within the plane defined by axis $Y_w$ at 30 and axis $Z_w$ at 42 and related to the object reference system 26, which rotation is indicated in phantom lines at 78, does not have any significant effect on the position of the illuminated portions 78, 78' on each reflecting members 46-51 and 46'-51', even if a relatively important shift "s" may be measured along axis $Z_w$ 42 for reflecting members 46 and 46'.

We claim:

1. A camera calibrating target for use with a laser source capable of generating a beam of coherent light defining a calibration plane, said camera being characterized by a field of view in the direction of an optical axis forming a predetermined angle with said calibration plane, said beam intersecting the field of view of said camera to define an object imaging area, said target comprising:

a frame defining a coplanar arrangement of reference points having known position coordinates within an object reference system associated with said frame and defining at least two dimensions, said frame being capable of being disposed in a camera calibration position wherein said coplanar arrangement of reference points is substantially parallel to said calibration plane; and an arrangement of light reflecting members protruding from said arrangement of reference points in a direction substantially perpendicular thereto, each said member having a light reflecting surface substantially parallel to said direction so as to extend within said object imaging area when said frame is disposed in said camera calibration position to allow said camera to capture an image formed by illuminated portions of said light reflecting members.

2. The camera calibrating target according to claim 1, wherein said reference points are located with one another within said arrangement and with respect to said coherent light beam so as to prevent shading of said reflecting members which may adversely affect said illuminated portions in forming said image.

3. The camera calibrating target according to claim 1, wherein said coplanar arrangement includes a plurality of reference points series extending substantially transversely to said coherent light beam and being disposed in parallel spaced apart relationship in the direction of said light beam from a foremost position on said frame proximal to said laser source to a rearmost position on said frame distal to said laser source.

4. The camera calibration target according to claim 3, wherein the respective points of adjacent ones of said series are transversely shifted with one another within said arrangement and with respect to the coherent light beam so as to prevent shading of said reflecting members which may adversely affect said illuminated portions in forming said image.

5. A camera calibrating apparatus for use with a laser source capable of generating a beam of coherent light defining a calibration plane, said camera being characterized by intrinsic imaging parameters and a field of view in the direction of an optical axis forming a predetermined angle with said calibration plane, said beam intersecting the field of view of said camera to define an object imaging area, said apparatus comprising:

a calibration target including:

a frame defining a coplanar arrangement of reference points having known position coordinates within an object reference system associated with said frame and defining at least two dimensions, said frame being capable of being disposed in a camera calibration position wherein said coplanar arrangement of reference points is substantially parallel to said calibration plane; and an arrangement of light reflecting members protruding from said arrangement of reference points in a direction substantially perpendicular thereto, each said member having a light reflecting surface substantially parallel to said direction so as to extend within said object imaging area when said frame is disposed in said camera calibration position to allow said camera to capture an image formed by illuminated portions of said light reflecting members; and image processor means for estimating position coordinates of said illuminated portions within an image reference system associated with said camera, for associating the estimated position coordinates of each said illuminated portion within said image reference system with the known position coordinates of a corresponding one of said reference points in relation with a corresponding one of said calibration planes within said object reference system, for calibrating a camera model based on said intrinsic imaging parameters with said associated known position coordinates and estimated position coordinates, and for using said. calibrated camera model to associate any position coordinates in said object reference system with corresponding position coordinates in said Image reference system.

6. The camera calibrating apparatus according to claim 5, wherein said reference points are located with one another within said arrangement and with respect to the coherent light beam so as to prevent shading of said reflecting members which may adversely affect said illuminated portions in forming said image.

7. The camera calibrating apparatus according to claim 5, wherein said coplanar arrangement includes a plurality of reference points series extending substantially transversely to said coherent light beam and being disposed in parallel spaced apart relationship in the direction of said light beam from a foremost position on said frame proximal to said laser source to a rearmost position on said frame distal to said laser source.

8. The camera calibration apparatus according to claim 7, wherein the respective points of adjacent ones of said series are transversely shifted with one another within said arrangement and with respect to the coherent light beam so as to prevent shading of said reflecting members which may adversely affect said illuminated portions in forming said image.

9. A method of calibrating a camera characterized by intrinsic imaging parameters and a field of view in the direction of an optical axis, said method comprising the steps of:
  i) generating a beam of coherent light defining a calibration plane;
  ii) disposing said camera so that its field of view in the direction of its optical axis forms a predetermined angle with said calibration plane and so that said beam intersects the field of view of said camera to define an object imaging area;
  iii) providing a calibration target including:
    a) a frame defining a coplanar arrangement of reference points having known position coordinates within an object reference system associated with said frame and defining at least two dimensions; and
    b) an arrangement of light reflecting members protruding from said arrangement of reference points in a direction substantially perpendicular thereto, each said member having a light reflecting surface substantially parallel to said direction;
  iv) disposing said frame in a camera calibration position wherein said coplanar. arrangement of reference points is substantially parallel to said calibration plane so that said light reflecting members extend within said object imaging area;
  v) generating with said camera an image formed by illuminated portions of said light reflecting members;
  vi) estimating position coordinates of said illuminated portions within an image reference system associated with said camera;
  vii) associating the estimated position coordinates of each said illuminated portion within said image reference system with the known position coordinates of a corresponding one of said reference points within said object reference system;
  viii) calibrating a camera model based on said intrinsic imaging parameters with said associated, known position coordinates and estimated position coordinates; and
  ix) using said calibrated camera model to associate any position coordinates in said object reference system with corresponding position coordinates in said image reference system.

10. The camera calibrating method according to claim 9, wherein said reference points are located with one another within said arrangement and with respect to the coherent light beam so as to prevent shading of said reflecting members which may adversely affect said illuminated portions in forming said image.

11. The camera calibrating method according to claim 9, wherein said coplanar arrangement includes a plurality of reference points series extending substantially transversely to said coherent light beam and being disposed in parallel spaced apart relationship in the direction of said light beam from a foremost position on said frame proximal to said laser source to a rearmost position on said frame distal to said laser source.

12. The camera calibration method according to claim 11, wherein the respective points of adjacent ones of said series are transversely shifted with one another within said arrangement and with respect to the coherent light beam so as to prevent shading of said reflecting members which may adversely affect said illuminated portions in forming said image.

* * * * *

UNITED STATES PATENT AND TRADEMARK OFFICE
CERTIFICATE OF CORRECTION

PATENT NO. : 7,429,999 B2  Page 1 of 1
APPLICATION NO. : 11/133243
DATED : October 30, 2008
INVENTOR(S) : Pierre Poulin et al.

It is certified that error appears in the above-identified patent and that said Letters Patent is hereby corrected as shown below:

Column 2
Line 38, the term "thereto" should read «to».

Column 5
Line 50, reference numeral "35" should read «38».

Column 6
Line 22, the term "Threshold" should read «threshold».
Line 36, the word "That" should read «that».

Claim 5
Column 13 line 11, the term "Image" should read «image».

Claim 9
Column 14 line 22, the "," should be deleted.

Claim 9
Line 39, the term "over" should read «is over».
Line 54, a "." should be added after the numeral «32».

Signed and Sealed this

Twenty-second Day of June, 2010

David J. Kappos
*Director of the United States Patent and Trademark Office*